United States Patent [19]

Miyamoto et al.

[11] Patent Number: 5,127,560
[45] Date of Patent: Jul. 7, 1992

[54] STORAGE BOX WITH OPENABLE LID FOR A MOTORCYCLE

[75] Inventors: Toshio Miyamoto, Hamamatsu; Mitsuya Tachibana, Shizuoka; Shinji Nakajima, Hamamatsu; Munenori Nagasaka, Shizuoka, all of Japan

[73] Assignee: Suzuki Kabushiki Kaisha, Japan

[21] Appl. No.: 644,263

[22] Filed: Jan. 22, 1991

[30] Foreign Application Priority Data

| Jan. 25, 1990 | [JP] | Japan | 2-15725 |
| Jan. 25, 1990 | [JP] | Japan | 2-15726 |
| Jan. 25, 1990 | [JP] | Japan | 2-15729 |
| Jan. 26, 1990 | [JP] | Japan | 2-16990 |
| Jan. 29, 1990 | [JP] | Japan | 2-16196 |
| Apr. 14, 1990 | [JP] | Japan | 2-98282 |
| Apr. 14, 1990 | [JP] | Japan | 2-98283 |

[51] Int. Cl.⁵ .................. B62J 7/00; B60R 7/00
[52] U.S. Cl. .................. 224/32 R; 224/42.42; 296/37.1; 280/769
[58] Field of Search .......... 224/32 R, 42.42, 0.5, 224/30 R, 33 R, 33 A, 41, 42.11; 280/769, 288.4; 296/37.1; 180/89.11, 89.17

[56] References Cited

U.S. PATENT DOCUMENTS 4,807,919  2/1989  Ito ........................... 224/32 R
5,025,883  6/1991  Morinaka et al. ............ 224/32 R Primary Examiner—Renee S. Luebke
Assistant Examiner—David J. Walczak
Attorney, Agent, or Firm—Bruce L. Adams; Van C. Wilks

[57] ABSTRACT

A storage box equipment of a motorcycle is disposed at substantially an upper central portion of a body frame of the motorcycle and comprises a storage box body having an upper portion defining an opening and having a rear portion supported to the body frame to be openable by a first hinge mechanism, a lid member for opening and closing the opening of the storage box body by a second hinge mechanism and a lock mechanism mounted to the storage box body for locking the lid member. The lock mechanism includes a pair of strikers which are engaged with a pair of hook disposed on the lid member and includes a solenoid which is attached to a base plate secured to the storage box body. The second hinge member is disposed at a front end portion of the storage box body and comprises a lever and a spring members. The lid member may be reinforced with a reinforcing member disposed on the side of the lid member. A seal member is provided for the storage box body and comprises an elastic member deformable in a sealing manner together with the lid member when the same is closed.

25 Claims, 15 Drawing Sheets

STORAGE BOX WITH OPENABLE LID FOR A MOTORCYCLE

CROSS-REFERENCES TO RELATED APPLICATIONS

The present patent application is directed toward technology which is related to similar technology disclosed within U.S. patent application Ser. No. 07/640,726 and 07/643,724 which are copending herewith.

BACKGROUND OF THE INVENTION

The present invention relates to a storage box disposed at substantially the upper central portion of a body frame of a motorcycle and provided with improved elements associated with the storage box.

In a general structure of a motorcycle, an engine unit is mounted below main tubes which are extended to the rear portion from a head pipe, and a seat is placed on seat rails which are extended further rearward from the rear end of the main tubes. A layout may be adopted, if it is necessary to provide a storage box which is capable of containing a large article such as helmet, that the storage box is positioned above the main tubes by relocating a fuel tank to a place such as under the seat.

The storage box is provided with an upper opening for introducing articles to be stored, and a lid is attached hereto. The lid is upwardly rotated or swung by a hinge mechanism for opening and closing the lid and is locked by a lock mechanism for locking it in a closed position. The hinge mechanism and the lock mechanism are disposed in the storage box body in a preferred arrangement, but it is desired, if possible, that they be small in size so as not to cause a reduction in the storage box volume.

On the other hand, there is a demand for a high functional capability which improves the operability in opening and closing the lid. For example, the following features are desired: provision of a spring to lighten the lid opening and closing force, easy locking and unlocking for the lock mechanism with the stable locked position, and a feasibility of manual unlocking at the time of a battery failure if it is electromagnetically operated while providing a security against a theft, for example, resulting in a problem that an increase in size and thickness is unavoidable if these demands are to be satisfied.

In another aspect, a seal member is interposed between the storage box and the lid to seal the interior so that rain or washing liquid does not enter thereinto at the closed position of the lid. To seal the opening of a storage box of this type, for a configuration where a seat is used instead of a movable cover, in a conventional arrangement, a rib raised at the peripheral edge of the opening is covered by a bead-like seal member so that a seat bottom is brought into contact thereto in a resilient manner. In a case of using a lid, an inner flange is formed on the lower edge portion of the lid so that the seal member contacts thereto in a resilient manner. However, if the lid has a shape as described above, a slide metallic mold is required, in the case of forming with plastics, for an undercut portion to be formed above the flange, making it disadvantageous from the standpoint of productivity and costs. In addition, a shrinkage cavity tends to occur on a surface at the portion from which the flange is raised, damaging the outer appearance, thus creating a problem for the sealing of the lid for the storage box equipment.

In a further aspect, the lid made of a synthetic resin thin plate does not have a sufficient rigidity and tends to be easily deformed. For reasons such as the outer appearance, the lid is usually attached so that the inner peripheral edge of the lower end thereof is brought into contact with the outer peripheral edge of the opening, whereby a gap is easily caused due to an outward deformation. Particularly, since a person's hand may easily be inserted into the storage box by forcibly pulling the side surface portion which may be most easily deformed, there is a fear that the stored articles may be stolen. Although improving the rigidity of the lid material to prevent this problem may be considered, it is difficult to achieve in terms of costs, weight or contained volume.

In a still further aspect, regarding the lock mechanism, a variety of mechanisms may be employed as the locking method thereof. The lock mechanism may be operated by a single switch and be readily operated by combining it with the key cylinder of the engine switch, resulting in the advantage of structural simplification. With an electromagnetic method, however, the unlocking may become impossible due to a failure in the electrical system, whereby a mechanical provision for an emergency unlocking system is necessary. Furthermore, it is required that the emergency unlocking system itself is also provided with an anti-theft function such as by means of a seat lock operation or a lock mechanism which cannot be operated in an unauthorized manner. In such case, if a large-sized device is to be added, a problem occurs that the advantage of the electromagnetic unlocking operation is significantly reduced.

SUMMARY OF THE INVENTION

A primary object of the present invention is to substantially eliminate the defects or drawbacks encountered in the prior art described above and to provide a storage box of a motorcycle having improved structures and arrangements.

Another object of the present invention is to provide a storage box of a motorcycle including a lid lock mechanism for locking a lid of the storage box body with an improved lid opening and closing function and capable of ensuring a large inner volume of the storage box even when the lock mechanism is disposed in the storage box body and capable of providing an improved rigidity and strength to the lid.

Another object of the present invention is to provide a storage box of a motorcycle including an improved seal mechanism with simple structure for sealing the lid and being capable of substantially completely preventing rain or washing liquid from entering into the storage box body.

A further object of the present invention is to provide a storage box of a motorcycle including an air outlet member for effectively bleeding air from the storage box body when the lid is closed.

A still further object of the present invention is to provide a storage box of a motorcycle including an emergency unlocking mechanism against theft, for example, without utilizing elements other than those of an existing electromagnetic unlocking unit.

A still further object of the present invention is to provide a storage box of a motorcycle including a lid member for the storage box body made with a flexible thin wall structure which is hardly deformed outwardly.

These and other objects of the present invention are achieved in one aspect by providing a storage box of a motorcycle including an engine unit disposed at substantially a central portion of a motorcycle body and below a main tube extending rearwardly from a head pipe and including a seat detachably mounted on a seat rail extending further rearwardly from a rear end of the main tube, the storage box being disposed at substantially an upper central portion of a body frame of the motorcycle, the storage box comprising a storage box body having an upper opening and having a rear portion supported on the seat rail to be upwardly openable by a first attaching means and a front portion secured to the main tube, a lid member for opening and closing the opening of the storage box body to be openable by a second attaching means, and a lock means mounted to the storage box body for locking the lid member, the lock means comprising a bilateral pair of striker members disposed on an inner surface of a rear wall of the storage box body and a bilateral pair of hook members disposed on an outer surface of a rear portion of the lid member at portions corresponding to locations of the striker members.

In a preferred embodiment, the striker members are rotatably supported through a striker shaft by bearing means disposed on a base plate secured to the rear wall of the storage box, each of the striker members is provided with a radial groove and a stepped portion and wherein the lock means further includes a lever member mounted to the striker shaft and a spring member disposed between the lever member and the base plate the lever member being engaged with the stepped portion of the striker in a locked position thereof and the spring member being urged in always move the striker member in a lock releasing direction. The lock means further includes a solenoid means disposed on the base plate to release the lever member from the stepped portion against spring force of the spring member.

The storage box body may be made of a resin material and composed of bilaterally dividable two halves.

The first attaching means may comprise a first hinge means for supporting the storage box body to be upwardly swingable and the second hinge means comprises a second hinge means for supporting the lid member to be upwardly swingable.

In another aspect of the present invention, there is provided a storage box of a motorcycle including an engine unit disposed at substantially a central portion of a motorcycle body and below a main tube extending rearwardly from a head pipe and including a seat detachably mounted on a seat rail extending further rearwardly from a rear end of the main tube, the storage box being disposed at substantially an upper central portion of a body frame of the motorcycle and comprising a storage box body having an upper opening and having a rear portion supported on the seat rail to be upwardly swingable by a first hinge means, a front portion secured to the main tube and a bottom plate, a lid member for opening and closing the opening of the storage box body to be upwardly swingable openable by a second hinge means, and a lock means mounted to the storage box body for locking the lid member, the second hinge means being secured to an inner front end portion of the bottom plate, the second hinge means comprising a base plate secured to the bottom plate, a pair of bearings disposed on the base plate in a standing manner for pivotally supporting the lid member through a support shaft of the lid member provided with an eccentric portion, a pair of swingable levers extending from the lid member and being secured to both ends of the support shaft, and a plurality of spring means having one end secured to the eccentric portion of the support shaft and another end secured to the base plate.

In a further aspect of the present invention, there is provided a storage box of a motorcycle including an engine unit disposed at substantially a central portion of a motorcycle body and below a main tube extending rearwardly from a head pipe and including a seat detachably mounted on a seat rail extending further rearwardly from a rear end of the main tube, the storage box being disposed at substantially an upper central portion of a body frame of the motorcycle and comprising a storage box body having an upper opening and having a rear portion supported on the seat rail to be upwardly swingable by a first hinge means and a front portion secured to the main tube, a lid member for opening and closing the opening of the storage box body to be upwardly swingable openable by a second hinge means, a lock means mounted to the storage box body for locking the lid member, and a bilateral pair of reinforcing means each being disposed on an inner surface of said lid member at a portion near the opening of the storage box body when the lid member is closed for preventing the lid member from being deformed when the same is pivoted to close the storage box body.

In a preferred embodiment, the two reinforcing means are disposed on an inner surface of the lid member at both longitudinal side portions thereof, each reinforcing means comprising a reinforcing tongue member inseparably extended from a material of the lid member, a pipe member fixed to an inner peripheral surface of the lid member and a reinforcing rib downwardly extending from the pipe member.

In a still further aspect of the present invention, there is provided a storage box of a motorcycle including an engine unit disposed at substantially a central portion of a motorcycle body and below a main tube extending rearwardly from a head pipe and including a seat detachably mounted on a seat rail extending further rearwardly from a rear end of the main tube, the storage box being disposed at substantially an upper central portion of a body frame of the motorcycle and comprising a storage box body having an upper portion defining an opening and having a rear portion supported on the body frame to be openable by a first attaching means, a lid member for opening and closing the opening of the storage box body by a second attaching means, and a lock means mounted to said storage box body for locking the lid member, the rear portion of the storage box body including a rear wall on which the lock means is secured, a through hole being formed in the rear wall at a portion behind the lock means. The through hole is closed by a front end of the seat when the same is disposed in its normal position.

In a still further aspect of the present invention, there is provided a storage box of a motorcycle disposed at substantially an upper central portion of a body frame of the motorcycle, the storage box comprising a storage box body having an upper portion defining an opening and having a rear portion supported on the body frame to be openable by a first attaching means, a lid member for opening and closing the opening of the storage box body by a second attaching means, a lock means mounted to the storage box body for locking the lid member, and a sealing means for maintaining a locked condition between the lid member and the storage box body in a sealed manner, the sealing means comprising an elastic seal member including a body portion mounted to a rib member disposed in a standing manner on substantially an entire edge portion of the upper portion of the storage box body defining the opening thereof, the elastic seal member being provided with a flanged portion extending outward from a free end of the body portion thereof, the flanged portion being deformed downwardly by a lower edge of the lid member in a manner tightly contacting to an inner surface of the lid member when the lid member is closed from an upper opened position.

In a preferred embodiment, the body portion of the elastic seal member has a structure astriding on the rib member. An air outlet is provided at a bottom portion of the storage box body for bleeding air therein when the lid is closed.

The storage box body may be made of a resin material and composed of bilaterally dividable two halves.

The first attaching means may comprise a first hinge means for supporting the storage box body to be upwardly swingable and the second hinge means comprises a second hinge means for supporting the lid member to be upwardly swingable.

According to the various aspects of the present invention of the characters described above, the locking of the lid member can be achieved by pressing the same downwardly and the unlocking of the same is also easily made only by operating a switching means. The locking and unlocking mechanisms are made into a simple unitary component disposed in the base plate. The locking of the lid member can be made at the bilateral two portions of the lid member, thus additionally increasing the rigidity thereof. Theft can be substantially prevented and the rigidity of the lid member can be further improved by locating the reinforcing mechanism with a simple structure.

The opening and closing of the lid member can be effectively performed by the hinge mechanism by utilizing the spring members of a simple structure for the wide utilization of the effective space of the storage box.

The location of the seal member for the lid member can substantially perfectly maintain the sealed condition, and the seal member is composed of an elastic member which is tightly deformed in the locked state together with the lid member. An air outlet for bleeding the air in the storage box body when the lid is closed is formed in the storage box.

As can be easily understood by persons in this art, the described functions and effects according to the present invention can be further improved by the possible combination of the respective embodiments.

BRIEF DESCRIPTION OF THE DRAWINGS

For a better understanding of the present invention and to show how the same is carried out, reference is now made, by way of preferred embodiments, to the accompanying drawings, in which.

DESCRIPTION OF THE PREFERRED EMBODIMENTS

Figure 1:
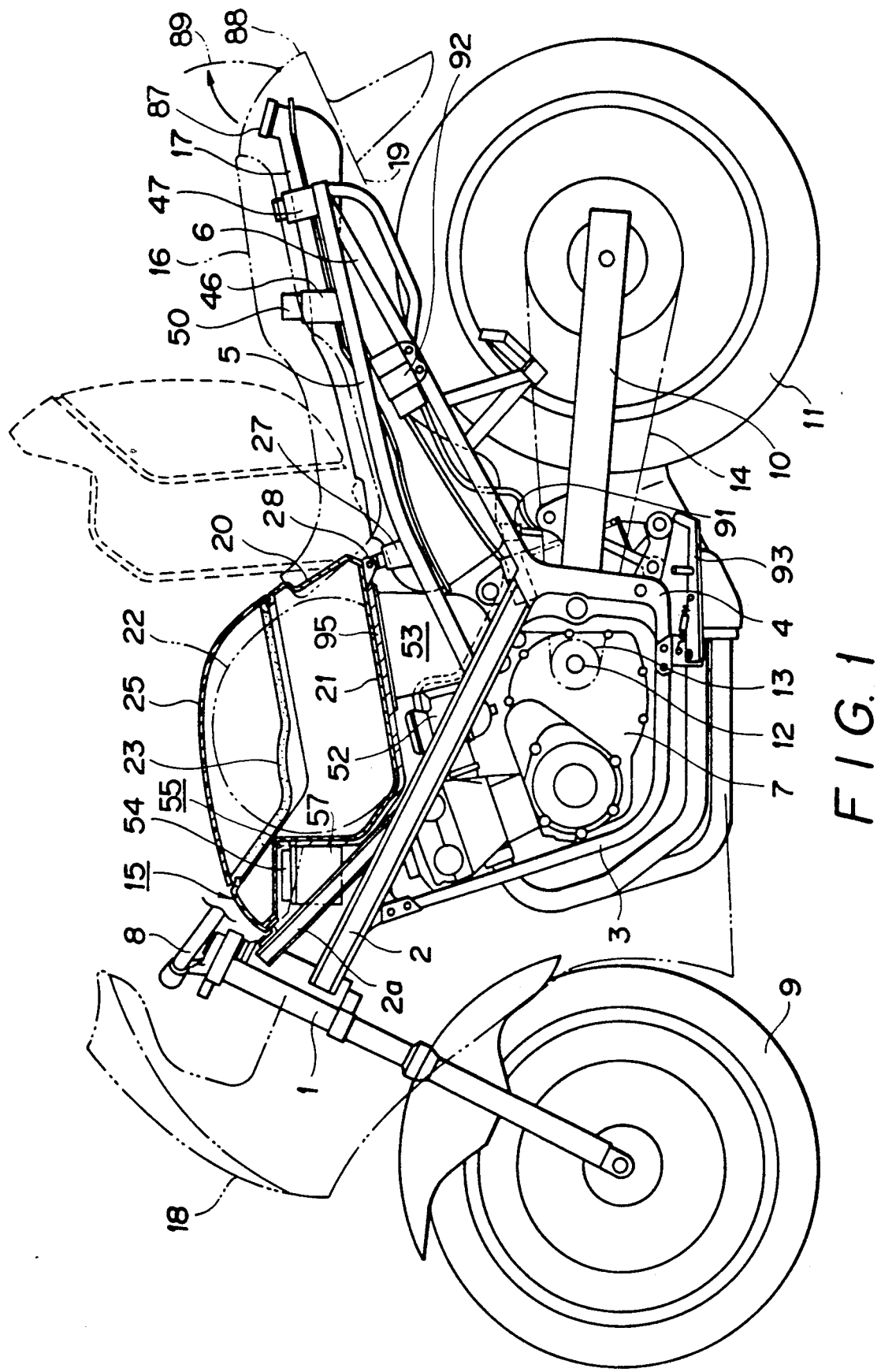
FIG. 1 is a longitudinal sectional side view of a motorcycle provided with a storage box according to the present invention.
Figure 2:
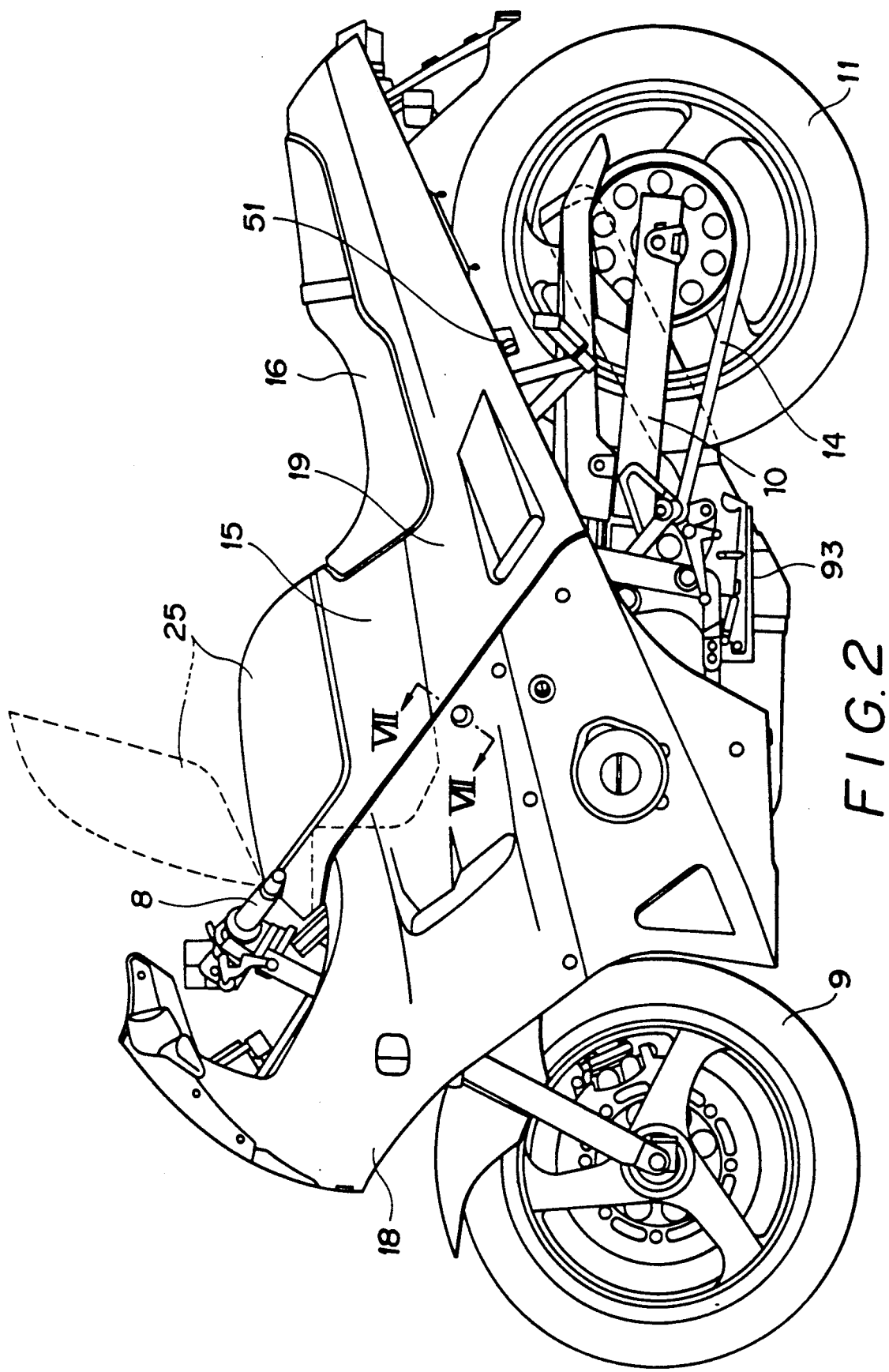
FIG. 2 is a side view of the motorcycle as shown in FIG. 1.
Figure 3:
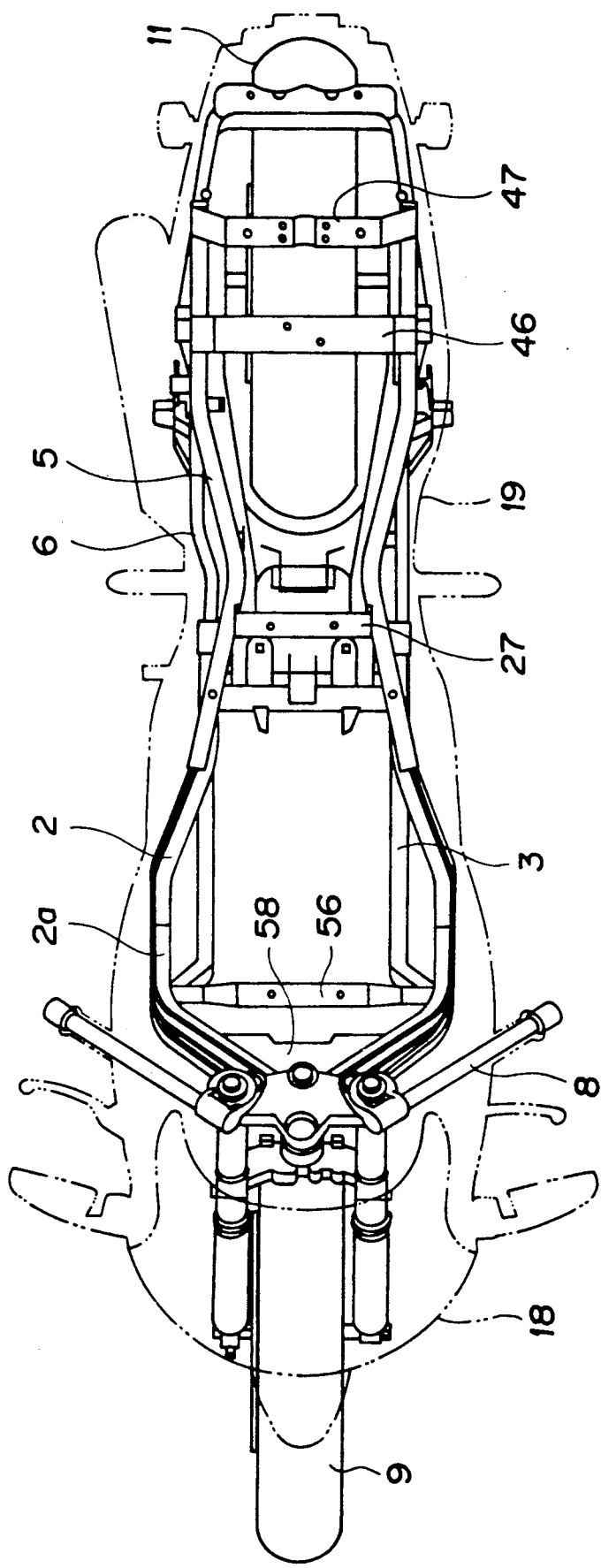
FIG. 3 is a top plane view showing the frame construction of the motorcycle as shown in FIG. 1.

Referring to FIGS. 1 to 3, a frame of a motorcycle has a left and right pair of main tubes 2 which are extended downwardly to the rear from a head pipe 1, left and right down tubes 3 which come down and then extended toward the rear, and left and right central pillars 4 which bind the rear ends of these tubes and, in addition, comprises left and right seat rails 5 which are connected to the rear end portion of the main tubes 2 and extended upwardly to the rear in an inclined manner, and a body tube 6 which is connected to the rear end of the main tubes 2 to support the rear end of the seat rails 5.

An engine unit 7 is suspended within the frame substantially at the central portion thereof. A front wheel 9 to be steered by a handle 8 is supported by means of a shaft at the head pipe 1, and a rear wheel 11 is supported at the rear end of a swing arm 10 which is shaft-supported by the central pillars 4. The rear wheel 11 is driven by way of a chain 14 from a drive sprocket gear 13 which is fixed to an output shaft 12 of the engine unit 7.

A storage box comprising a storage box body 15 is positioned over the main tubes 2 and the front portion of the seat rails 5, and a tandem-like seat 16 which may also serve as a pillion seat is placed rearward therefrom on the seat rails 5. Because of the positioning of the storage box 15, a fuel tank 17 is located within a space under the seat 16 surrounded by the seat rails 5 and by the body tube 6.

Both of the sides extending from the front of the engine unit 7 to the portion below the storage box 15 are covered by a cowling 18, and in continuation therefrom, the portion below the lower edge of the seat 16 and the both sides of the fuel tank 17 are covered by a body cover 19.

Figure 4:
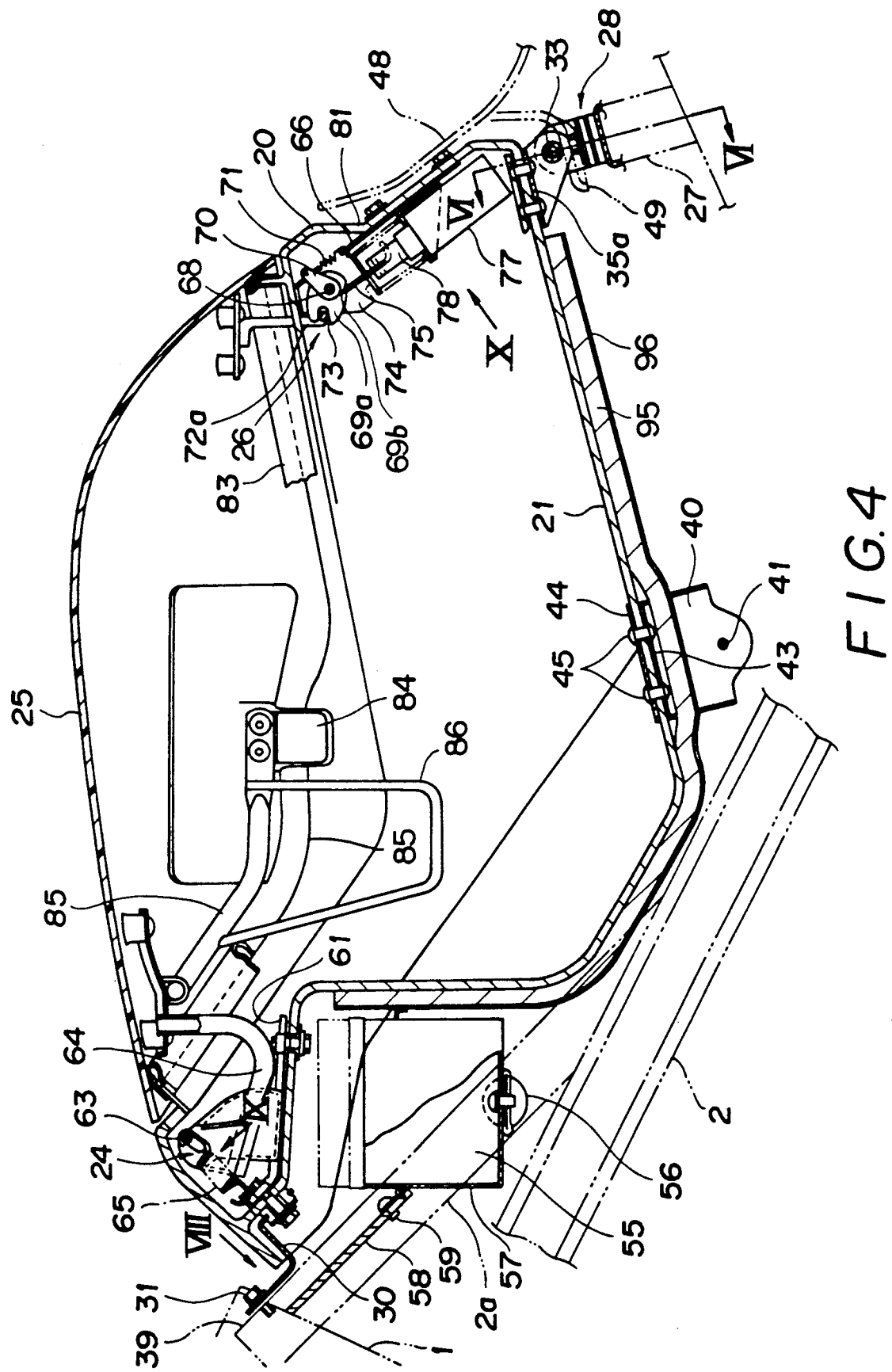
FIG. 4 is a sectional side view, in an enlarged scale, of the storage box shown in FIG. 1.
Figure 5:
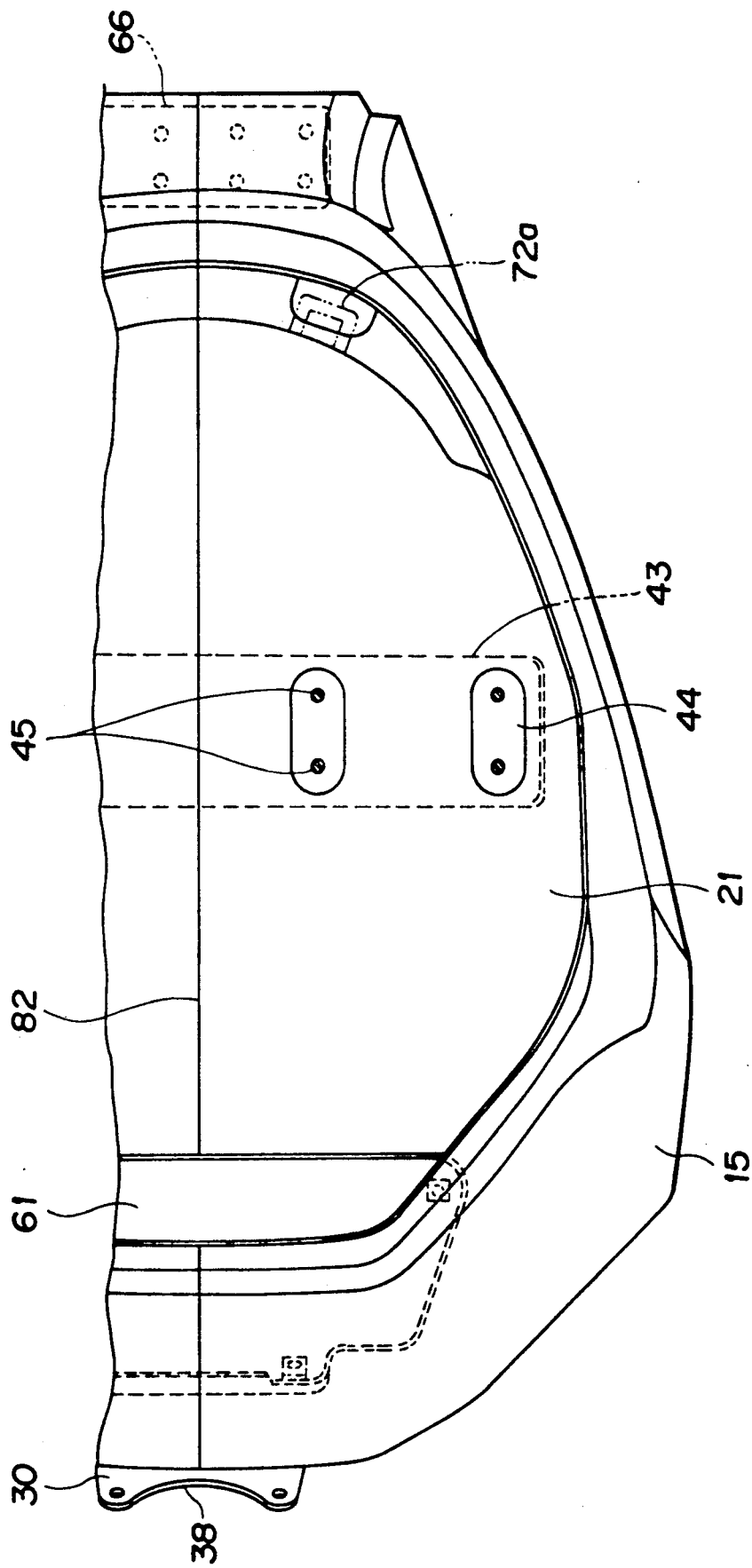
FIG. 5 is a top view showing a part of the storage box of FIG. 4 with a lid therefor being removed.

Detail of the storage box 15 is shown in FIG. 4 and FIG. 5.

The main tubes 2 are connected to the lower portion of the head pipe 1, and upper main tubes 2a for reinforcement span from a position toward the center thereof to the upper portion of the head pipe 1. Both of these tubes 2 and 2a are led from the head pipe 1 to the rear after once during the course being extended outwardly from both sides and, after passing the central portion of the main tubes 2, converge narrowly towards the front end portion of the seat rails 5.

Such convergence continues within a first quarter portion of the seat rails 5 or up to the front end portion of the seat 16 and a gradual widening occurs from that point on toward the central portion thereof, and the tubes 2 are extended to the rear portion substantially parallel to each other for the remaining half.

The storage box 15 has a substantially egg-like contour as viewed from the top, that is, becomes rounded at the front end and tapers off toward the rear so as to be compatible with the shape of the upper main tubes 2 and the seat rails 6, and when seen from the side, the lower edge of its front half extends along the upper main tubes 2a while a rear wall 20 thereof is inclined downwardly to the rear so as to be parallel thereto, resulting in substantially a parallelogram.

This storage box 15 has a bottom plate 21, contains a volume sufficient to accommodate a "full-face" helmet 22, for example, and is provided with an opening 23 on the upper surface thereof through which insertion and removal of the helmet is possible. Attached to the opening 23 is a lid 25 of which the front end is capable of being opened and closed upwardly to the front by means of a hinge mechanism 24. The lid 25 may be locked at its closed position by a lock mechanism 26.

The storage box 15 is fixed as will be described below. In particular, a base plate 27 is placed to span the narrowest portion of the left and right seat rails 5, and while the lower surface at the rear end of the storage box 15 is shaft-supported on this base plate 27 via a hinge mechanism 28 so that it is swingable upwardly to the rear, a front plate 30 which projects to the front and is attached via cushion 29 to the front lower surface thereof and is fastened with a bolt 31 to the front end of the upper main tube 2a.

Figure 6:
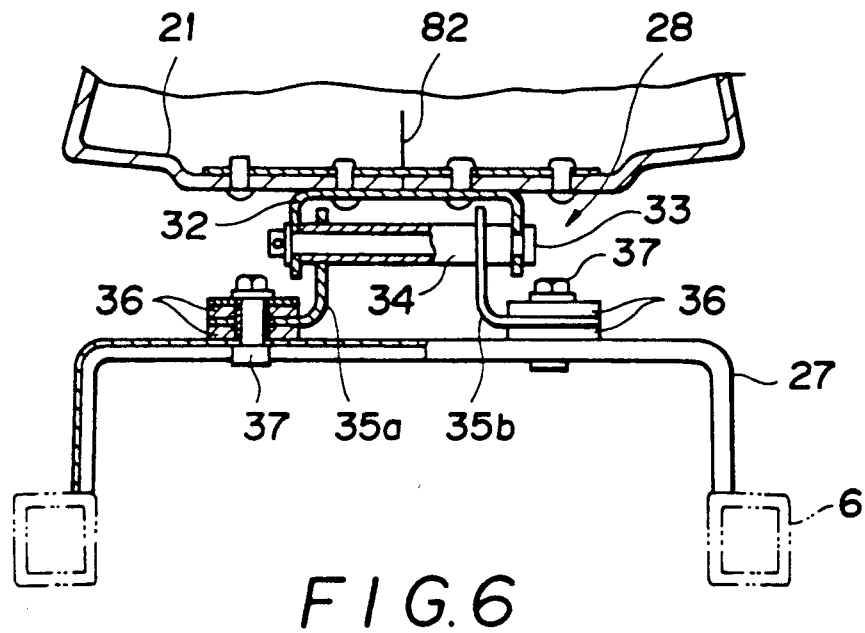
FIG. 6 is an enlarged cross section taken along the line VI—VI in FIG. 4.

The hinge mechanism 28 as shown in FIG. 6 is constructed such that a bearing bracket 32 is riveted to the rear end lower surface of the storage box bottom plate 21 to hold a supporting shaft 33 and, on the other hand, attaching brackets 35a, 35b respectively welded to both end portions of a pipe 34 are attached via cushions 36 onto the base plate 27 by bolts 37.

Figure 8:
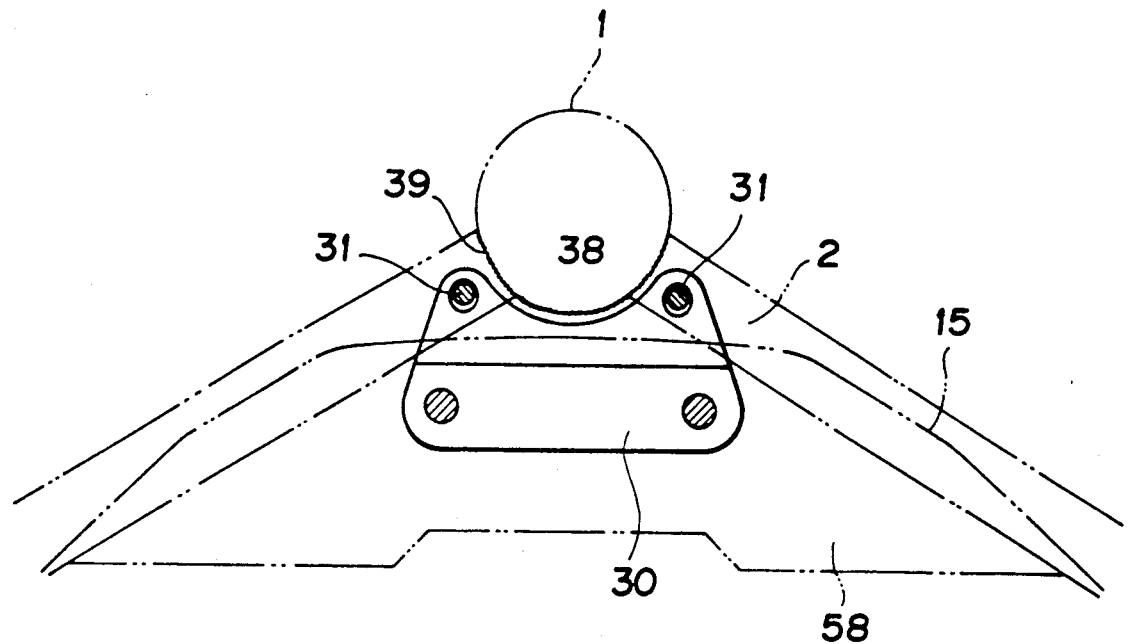
FIG. 8 is an enlarged top view as seen from an arrow VIII in FIG. 4.

The front plate 30 as shown in FIG. 8 is formed with a semicircular notch 38 at the front edge thereof to constitute a surface parallel to the upper surface of the upper main tubes 2a, and is designed such that, at its attached position, it comes close to the connecting portion between the head pipe 1 and the upper main tubes 2a so as to encircle the back surface of the pipe 1 by the notch 38. Thus the line of welding bead 39 at the connecting portion between the head pipe 1 and the upper main tubes 2a is concealed.

Figure 7:
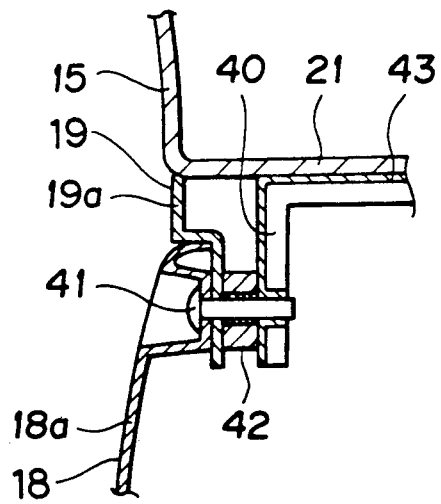
FIG. 7 is an enlarged cross section taken along the line VII—VII in FIG. 2.

Further, a downwardly projecting side attaching bracket 40 is provided at both the sides of the central portion of the storage box 15, and as shown in FIG. 7, is coupled by a pin 41 via a cushion 42 to connecting edge portions 18a, 19a at which the cowling 18 and body cover 19 overlap each other. The left and right portions of the side attaching bracket 40 continue to each other through a base 43, and the base 43 is extended along the lower surface of the bottom plate 21 and is fixed thereto by means of rivets 45 together with a backing strip 44 on the upper surface thereof.

On the other hand, provided at the rear portion of the seat rails 5, spanning the left and right thereof, are seat plates 46, 47 on which the seat 16 is placed. In this case, as shown in FIG. 4, a seat bottom plate front end portion 48 is provided with an inclination upwardly to the front so that it may come close to the rear wall 20 of the storage box 15 to thereby cause an overlapping.

The seat 16 is fixed by a conventional mechanism with which a seat lock 50 provided on the seat plate 46 is caused to work when an inserting bracket 49 projecting frontward from the seat bottom plate front end portion 48 is inserted from the rear into an inserting hole of the base plate 27. Thus, in this fixed state, swinging of the storage box 15 is prevented by the seat bottom plate front end portion 48. A seat lock 50 may be unlocked by a cylinder lock 51 and a key which is located at the lower edge portion of the body cover 19.

By unlocking the seat lock 50 to remove the seat 16 and then by removing the front plate 30 and the side attaching bracket 40, the storage box 15 may be swung upwardly to the rear by means of the hinge mechanism 28. Such swung angle is close to 90° or more, where the positional relationships thereof are set such that most of the portions of the storage box 15 are moved to the backside as seen from the shaft axis of the supporting shaft 33 of the hinge mechanism 28 so that it can stand upright on the upper surface of the fuel tank 17, as shown in dashed lines in FIG. 1.

In this way, by swinging the storage box 15 upwardly to the rear, the space above the engine unit 7 is cleared, making easier maintenance and inspection of the portions of the engine and auxiliaries thereto. For example, maintenance works such as adjusting of a carburetor 52, filter change for an air cleaner 53 and furthermore supplying of battery electrolyte for a battery 54 located nearby will be made easier.

A concave chamber 55 concaved in a substantially vertical manner is formed at the front end portion of the bottom plate 21 of the storage box 15. The battery 54 is held by a battery holder 57 located on a flat bridge tube 56 which spans the front edge portion of the upper main tubes 2a and is accommodated in the concave chamber 55 without any interference.

A triangular reinforcing plate 58 is welded between the front end of the upper main tubes 2a and the head pipe 1. A portion of the battery holder 57 is fastened by a bolt 59 to the upper surface of this reinforcing plate 58.

Figure 9:
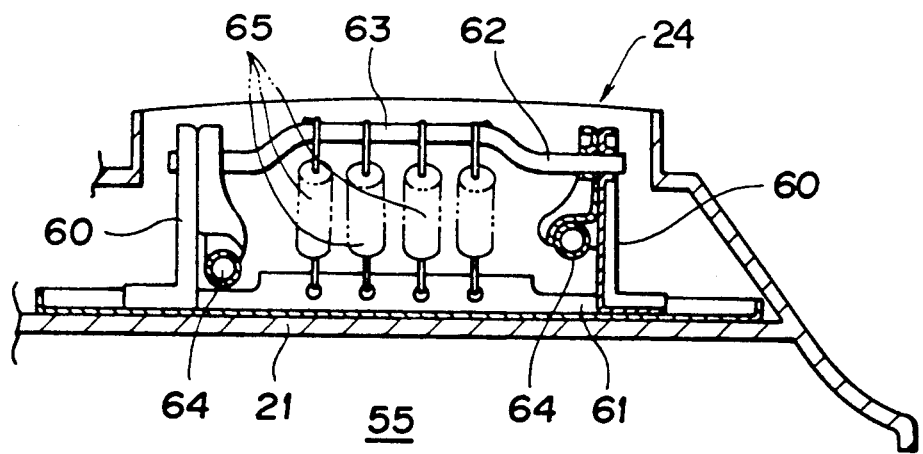
FIG. 9 is an enlarged rear view as seen from an arrow IX in FIG. 4.

Next, as shown in FIG. 9, the hinge mechanism 24 of the lid 25 shaft-supports the supporting shaft 62 of the lid 25 in a pivotal manner, where a base plate 61 having bearings 60 raised on the both sides thereof is attached to the front end portion of the bottom plate 21, i.e., to the upper wall of the concave chamber 55. A supporting shaft 62, provided with a crank-like eccentric portion 63, is fixed to the front end of left and right swinging levers 64 which are extended frontward from the front end of the lid 25. A plurality of coil springs 65 are loaded in parallel between the eccentric portion 63 of the supporting shaft 62 and the base plate 61.

The relationship between the force of the coil springs 65 and the eccentric portion 63 is set for the most part to produce a force in the direction to open the lid 25 and, within the range where the degree of such openness is small, to cause to reverse it to the closing direction beyond the dead point.

In this way, the hinge mechanism 24 is formed into a compact entity and acts effectively upon the opening and closing operation of the lid 25. Because of its small size, it does not consume space from the effective volume of the storage box 15.

Figure 10:
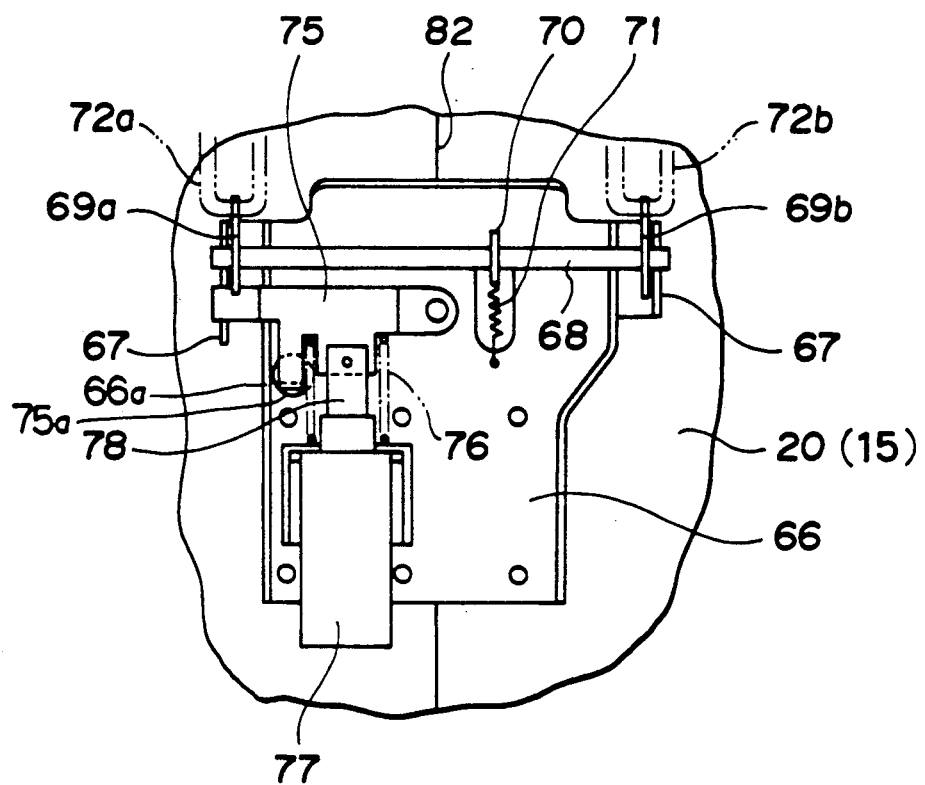
FIG. 10 is an enlarged front view as seen from an arrow X in FIG. 4.

On the other hand, as shown in FIG. 10, the lock mechanism 26 of the lid 25 is attached to the inner surface along the rear wall 20 of the storage box 15 by means of the base plate 66.

Bearings 67 are extended from the left and right of the upper portion of the base plate 66, whereby a striker shaft 68 is pivotally shaft-supported. Fixed to the striker shaft 68 at the both ends thereof are left and right strikers 69a, 69b, and a lever 70 is also fixed thereto, and a spring 71 is suspended therefrom at the interval to the base plate 66 so that the strikers 69a, 69b are at all times urged in the releasing direction.

A left and right pair of hooks 72a, 72b are extended from the rear end portion of the lid 25 so that, when the lid 25 covers the opening 23 of the storage box 15, the distal ends thereof engage with radial grooves 73 to pivot the strikers 69a, 69b in the locking direction.

One of the strikers 69a is formed with a cam face thereon having a stepped portion 74 at the outer periphery thereof, as shown in FIG. 4, and an engaging lever 75 is resiliently brought into contact with this periphery by means of spring 76. As described, when the strikers 69a, 69b are pivoted into the locking direction, the engaging lever 75 engages with the stepped portion 74 to prevent a reversed rotation in the unlocking direction, where the hooks 72a, 72b cannot escape. In other words, the lock mechanism 26 works.

The engaging lever 75 is coupled in a linkage to a movable magnetic core 78 of a solenoid mechanism 77. Upon an electric energization of the solenoid mechanism 77, the movable magnetic core 78 pulls the engaging lever 75 against the spring 76, whereby the strikers 69a, 69b are freed to unlock the lock mechanism 26.

Figure 13:
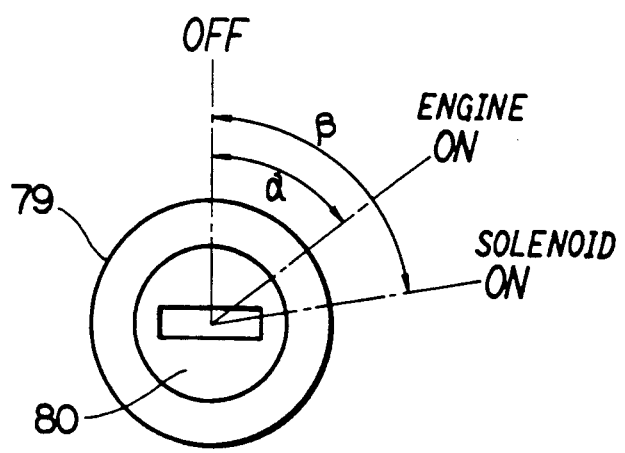
FIG. 13 is a view illustrating an engine switch.

As shown in FIG. 13, the power switch for the solenoid mechanism 77 is associated with an engine switch 79. The engine is entered into its operable state at a rotated angle α of a cylinder lock 80 to be effected by the key to the engine switch 79. When the cylinder lock is further rotated and is brought to the position at an angle β, the solenoid mechanism 77 is energized. The engine is in its operable range also at the angle β. It is automatically returned by means of a spring from the position at the angle β to the position at α. Thus the lid 25 may be opened irrespective of whether the engine is operated or stopped.

In case the solenoid mechanism 77 cannot be actuated because of a failure in the electrical system, a small through hole 66a bored through both the base plate 66 and the rear wall 20 is provided behind the movable magnetic core 78 of said solenoid system 77. A projecting piece 75a is extended from the engaging lever 75 at the position opposite to the small hole 66a (FIG. 10).

By inserting a screwdriver or the like into the small hole 66a from the outside of the rear wall 20 to push down the projecting piece 75a, the engaging lever 75 is moved from the stepped portion 69b instead of by an electromagnetic force, thereby freeing the strikers 69a, 69b to unlock the lock mechanism 26. This is provided for an emergency when the solenoid system 77 is inoperable due to a failure in the electrical system.

As described, the seat bottom plate front end portion 48 is caused to overlap the outside surface of the rear wall 20. It is designed such that said small hole 66a is thereby concealed. Thus it is impossible to unlock by using the small hole 66a unless the seat 16 has been removed. Since the seat 16 is provided with the seat lock 50 and persons other than those who can unlock the same cannot easily render the emergency unlocking, this system is effective against theft.

As described above, the through hole 66a is covered over along the outer surface thereof by the front end portion of the seat 16 in the seat lock position. Thus persons other than those who can unlock the seat lock 50 cannot easily render a manual unlocking.

In this way, the lock mechanism of the lid 25 is compactly arranged and, similarly as the hinge mechanism 24, may be held within the storage box 15 in a space-saving manner. Since the hooks 72a, 72b are provided in a pair to the left and right in addition to the strikers 69a, 69b, the attached posture of the lid 25 is hardly collapsible. It is thus possible to reduce the thickness of the lid 25. Further, since the mechanism is placed along the rear wall 20 of the storage box 15, it may be provided with a secure manual unlocking system.

In a desired embodiments, the storage box body 15 may be formed by a bilaterally divided pair of two box halves made of resin material, which are welded or bonded to each other as a unitary storage box body as shown by a cementing line 82 in FIGS. 5, 6 and 10. Thus, the productivity can be improved through a monolithic molding operation.

In addition, as described above, the bearing bracket 32 of the hinge mechanism 28, the front plate 30, the base plate 43 of the side attaching bracket 40, the base plate 61 of the hinge mechanism 24 and the base plate 66 of the lock mechanism 26 are each fixed to the storage box 15 spanning the two halves so as to bind them with a high degree of strength.

A reduction in thickness is therefore possible and the rigidity and strength of welding may be lower.

Figure 11:
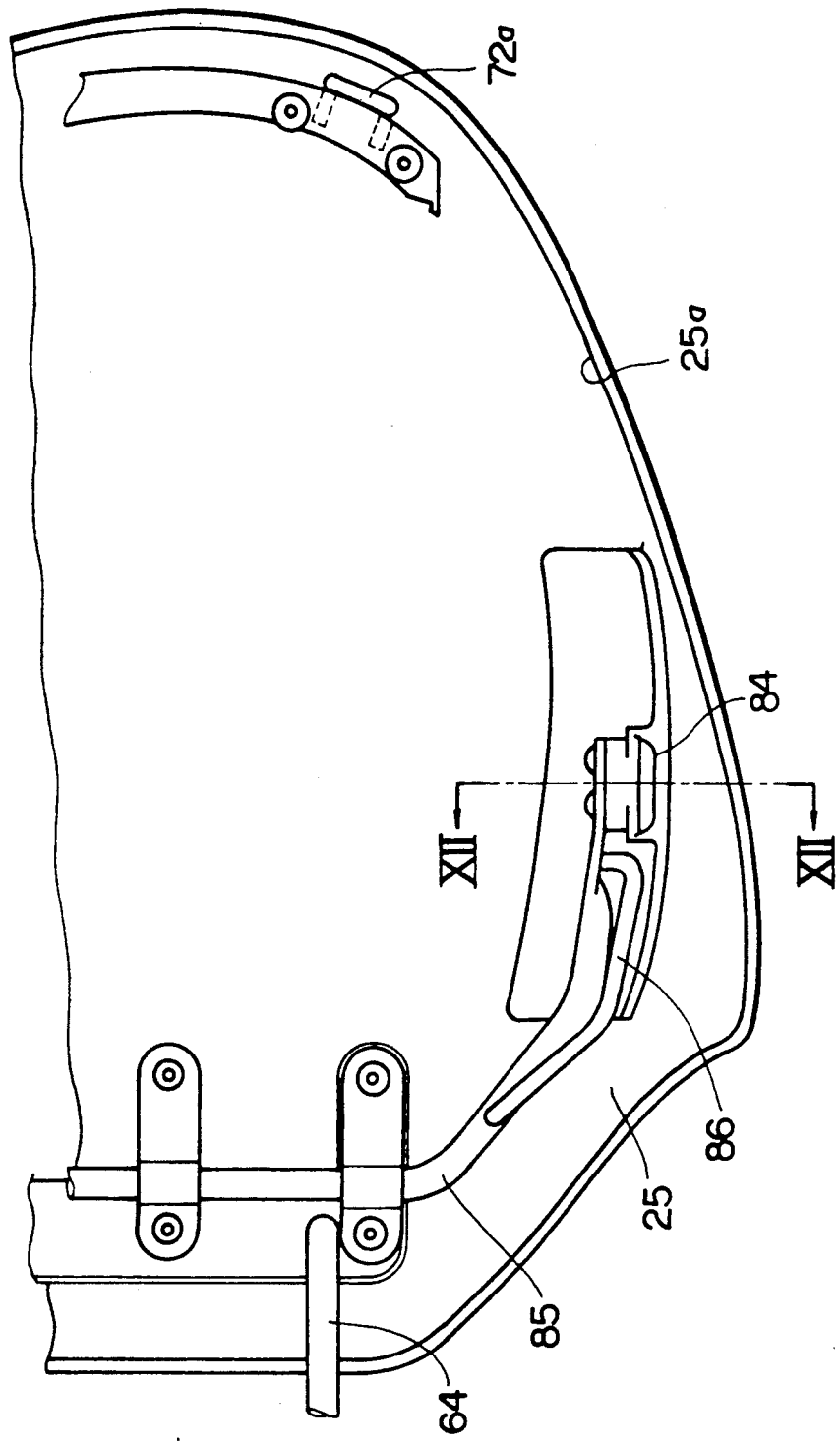
FIG. 11 is a bottom view showing a main portion of the lid as shown in FIG. 4.
Figure 12:
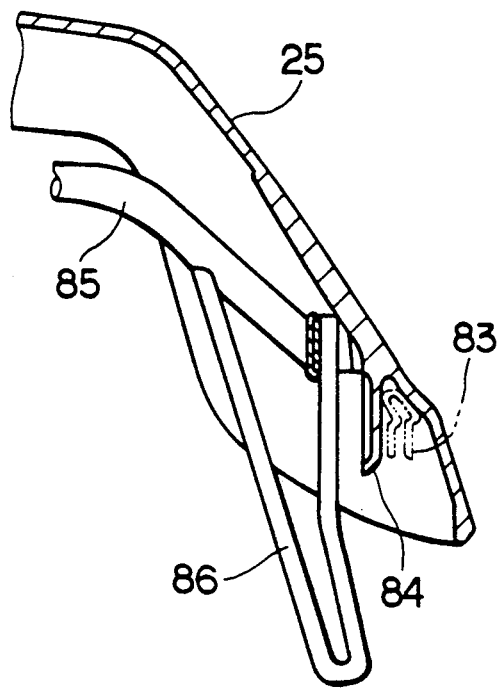
FIG. 12 is a cross section taken along the line XII—XII in FIG. 11.

Furthermore, as shown in FIGS. 11 and 12, the lid 25 is provided with a deformation preventing system.

The lid 25 is attached such that the inner surface of its peripheral edge portion contacts from the outside to a seal 83 which accompanies the opening 23 of the storage box 15. A reinforcing member 84 in the shape of a tongue inseparably extended from the material of the lid 25 extends downwardly from each of the side portions of the inner surface of the lid 25 with an interval to the inner surface, and also provided thereat is a tubular reinforcing rib 86 coming down, with an interval to the inner surface, from a pipe 85 which is fixed to the inner peripheral surface.

The tongue 84 and reinforcing rib 86 are inserted into the inside of the seal 8.3 when the lid 25 is put on. In this way, the peripheral edge of the opening 23 is interposed between the outside and inside objects, and deformation of the lid as is prevented. Particularly, this configuration is effective against the type of theft where the stored articles are taken out by forcibly expanding the both side portions of the peripheral edge of the lid 25.

The materials and the shapes of the reinforcing member 84 and the rib 86 may be freely selected as occasion demands, for example, steel plate or round rod.

Figure 14:
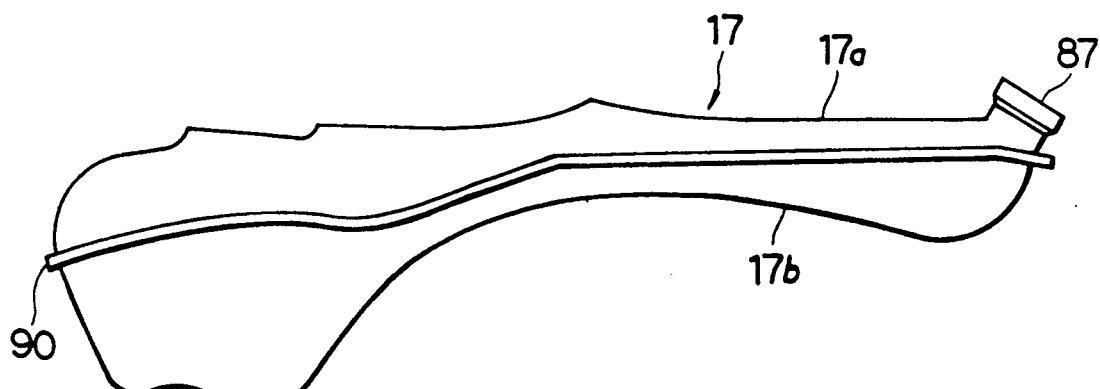
FIG. 14 is an enlarged side view of a fuel tank as shown in FIG. 1.
Figure 15:
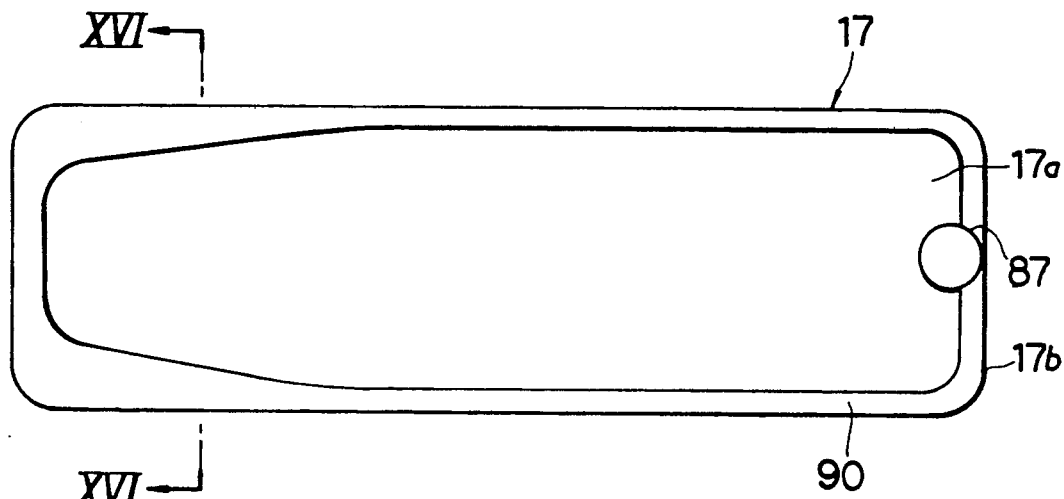
FIG. 15 is an enlarged top view of the fuel tank as shown in FIG. 1.
Figure 16:
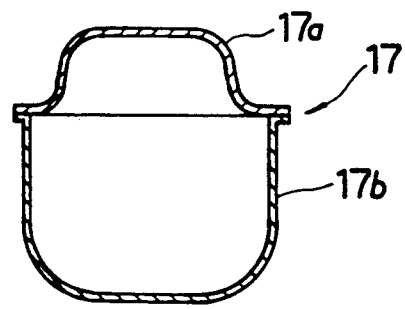
FIG. 16 is a cross section taken along the line XVI—XVI in FIG. 14.

Since the fuel tank 17 is to be placed within the body cover 19, under the seat 16 as shown in FIGS. 14, 15 and 16, it is slenderly constructed generally along the seat rails 5 and is sloped to be higher at the rear. Its rear end is extended to the position below a tail cover 88, and an inlet 87 is placed on the upper surface thereof. By opening a lid 89 provided on the tail cover 88, an injection of fuel is possible through this inlet 87.

The fuel tank 17 is completed by binding half-tanks 17a, 17b that have been formed as the upper and lower halves. A flange 90 is formed along the binding surface to perform the seam welding. Furthermore, since the seat rails 5 are narrowly converged at the first front quarter portion, the upper half tank 17a is formed to taper off to be positioned within the seat rails 5, and the corresponding portion of the flange 90 is broadened by the amount of such tapering off and attached thereat to the lower surface of the seat rails 5. The front portion of the lower half-tank 17b is not reduced in width. That is, a substantially rectangular shape is formed, when seen from the top, accounting for most of the tank volume at this portion.

A fuel cock 91 is provided at the bottom under the front end of the fuel tank 17, the most closely located position, and toward the right side as seen from the rider on the seat 16. Because it is located at a low position and thus is close to the line of the chain 14, interference with the chain must be avoided.

A fuel pump 92 is provided at the left side of the body tube 6 in a longitudinally laid manner. In addition to the covering protection rendered by the body cover 19, the relatively precise fuel pump 92 may be prevented from a damage or loss that occurs as a result of receiving a shock loaded by the body weight, because the left is the side on which a side stand 93 is located and, in such case, the body in a parking position is more likely to fall to the right side.

A reservoir tank 94 for the brake oil is provided on the seat rail 5 at the opposite side of the fuel pump 92.

It is to be noted that an insulating plate 95 is provided to cover the lower surface of the bottom plate 21 of the storage box 15. Since the box is located directly above the engine unit 7, it is designed to prevent damage to the objects stored in the box caused by heat by insulating mainly the radiant heat from the engine unit 7. By further affixing a lustrous film 96 such as of aluminum foil to the lower surface of the insulating plate 95, such insulating effect may be doubled.

In the conventional storage box and that of the aforementioned embodiment, a seal member may be interposed between the storage box and the lid to seal the interior so that rain or washing liquid does not enter thereinto at the closed position of the lid. To seal the opening of a storage box of this type, for a configuration where a seat is used instead of a movable cover, a rib raised at the peripheral edge of the opening is covered by a bead-like seal member so that a seat bottom is brought into contact thereto in a resilient manner. In case of using a lid, an inner flange is formed on the lower edge portion of the lid so that the seal member contacts thereto in a resilient manner. However, if the lid has the shape as described above, a slide metallic mold is required, in the case of forming with plastics, for an undercut portion to be formed above the flange, making it disadvantageous in terms of productivity and costs. In addition, a shrinkage cavity tends to occur on a surface at the portion from which the flange is raised, damaging the outer appearance, thus there exists a problem for the sealing of the lid for the storage box.

This problem is solved by the present invention by providing a storage box having an improved seal mechanism described hereunder as preferred embodiments of the present invention in conjunction with FIGS. 17 to 21, in which like reference numerals are added to portions and members corresponding to those of the aforementioned embodiment and the descriptions thereof are omitted herein for the sake of simplification.

Figure 20:
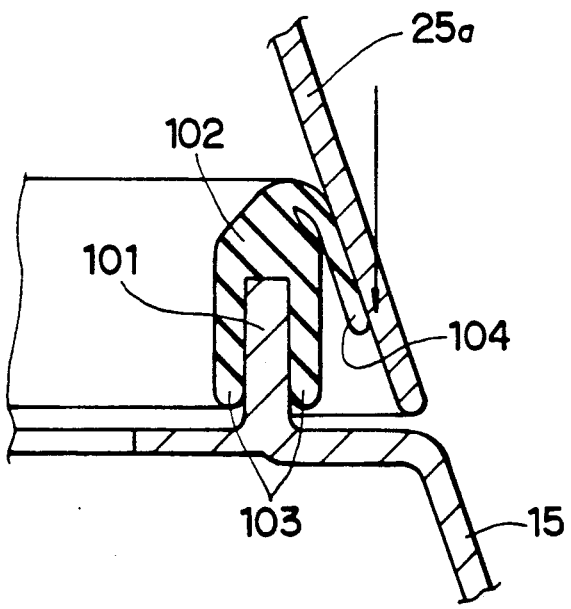
FIG. 20 is also a sectional view, in an enlarged scale, of the seal member taken along the line XIX—XIX in FIG. 17 in which the seal member is in the operating position.

As shown in FIGS. 17 to 20, the seal member 102 in section has a crotch-like leg portion 103 and a flange portion 104 which is almost vertically extended to one side from the top edge thereof, and it is formed into a strip-like shape by a resilient material such as rubber. Further, it is attached in continuation to substantially the whole of a continuous peripheral edge of the opening 23 by interposing the rib 101 in the crotch-like leg portion 103 so as to direct the flange portion 104 outward. Adhesives may be used as required between the leg portion 103 and the rib 101. In this way, when the lid 25 is operated to close the opening 23 of the storage box 15, the lower edge portion 25a of the lid 25 abuts against the flange portion 104 (FIG. 19) and then descends while causing the same to be bent by pushing. Since the lower edge portion 25a is widened toward the edge, the flange portion 104 is pressed also inwardly as such descending proceeds and, ultimately, contacts resiliently with the inner surface of the lower edge portion 25a in a downwardly folded manner (FIG. 20). The interior of the storage box 15 is thus sealed.

While the sealing ability corresponds to the resilient force of the flange portion 104, the width and thickness of the flange portion 104 are set to the minimum because the operation for closing the lid 25 is made heavy by a strong resilient force thereof. On the other hand, the operating force for closing the lid 25 is lightened by applying a silicone oil on the upper surface of the flange portion 104.

Furthermore, since the interior of the storage box 15 is kept in the sealed state by the action of the seal member 102 from the point at which the lower edge portion 25a of the lid 25 first contacts the flange portion 104 (FIG. 19) to the point at which the downwardly folded state occurs (FIG. 20), the internal pressure of the box is increased with the descending of the lid 25, resulting in a resistance which makes the closing operation heavier.

Figure 17:
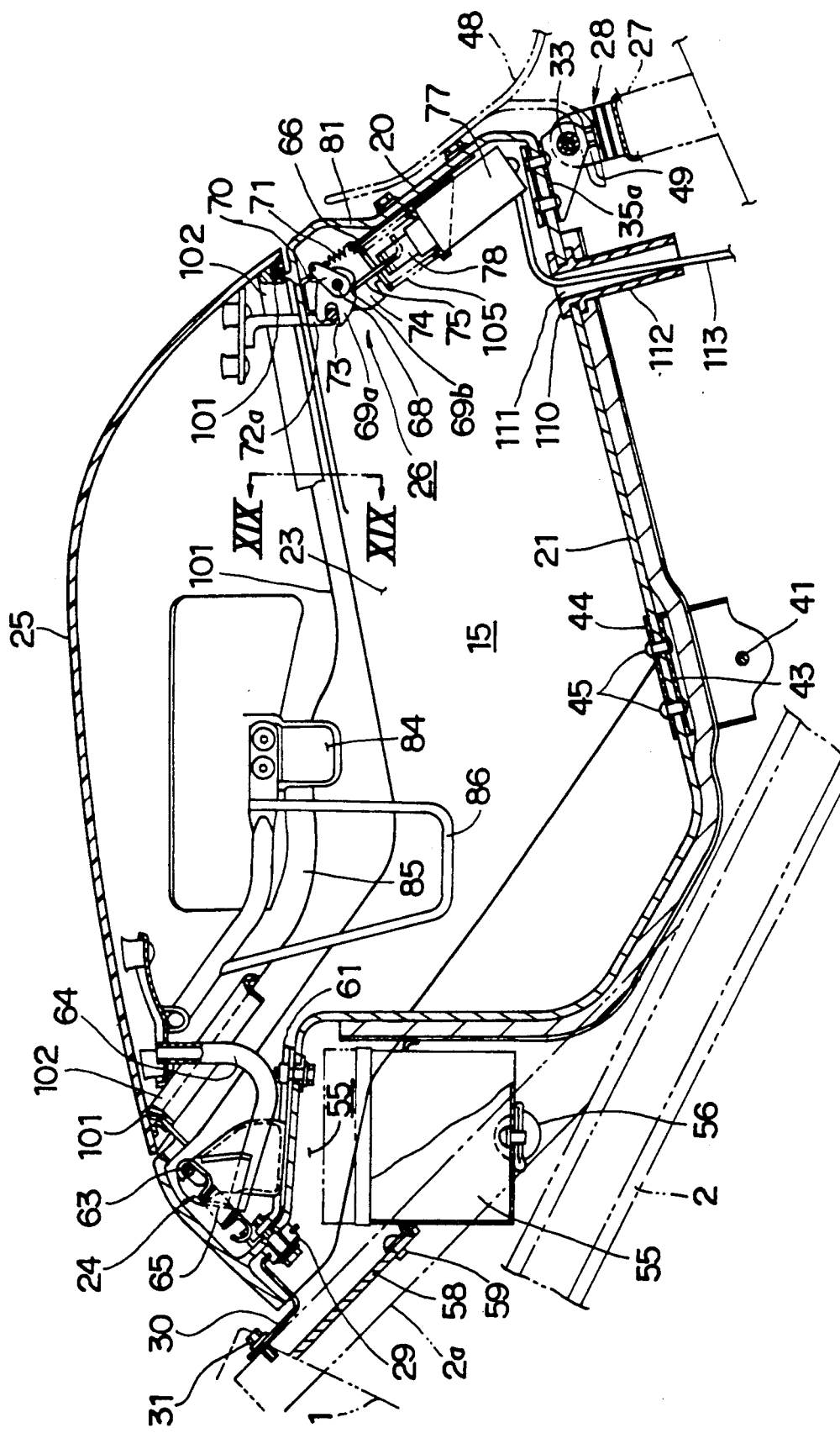
FIG. 17 is a longitudinal sectional side view of a storage box, similar to that of FIG. 4, of another embodiment according to the present invention.
Figure 18:
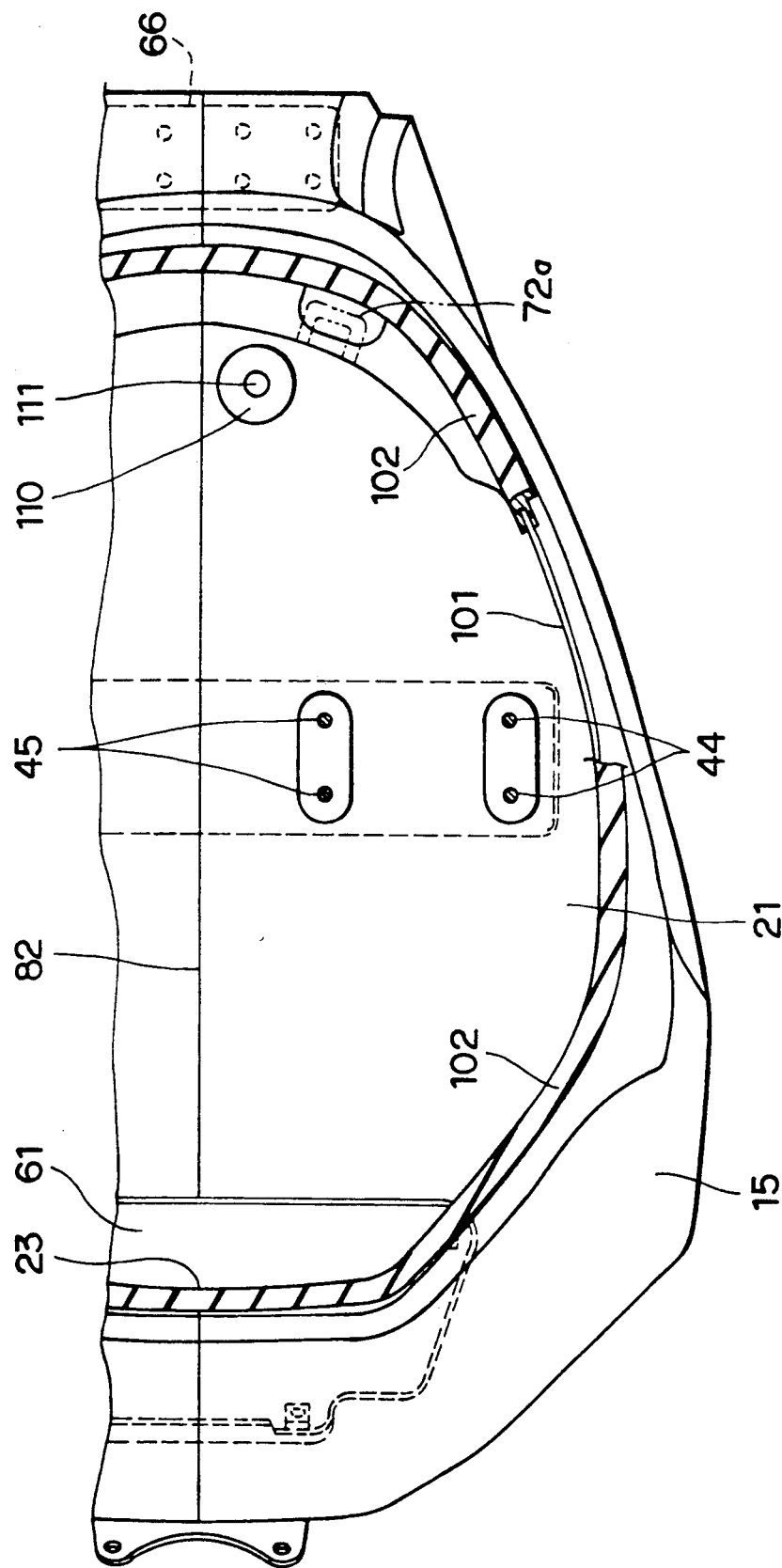
FIG. 18 is a plan view similar to that of FIG. 5 showing the central portion of the lid according to another embodiment of FIG. 17.
Figure 19:
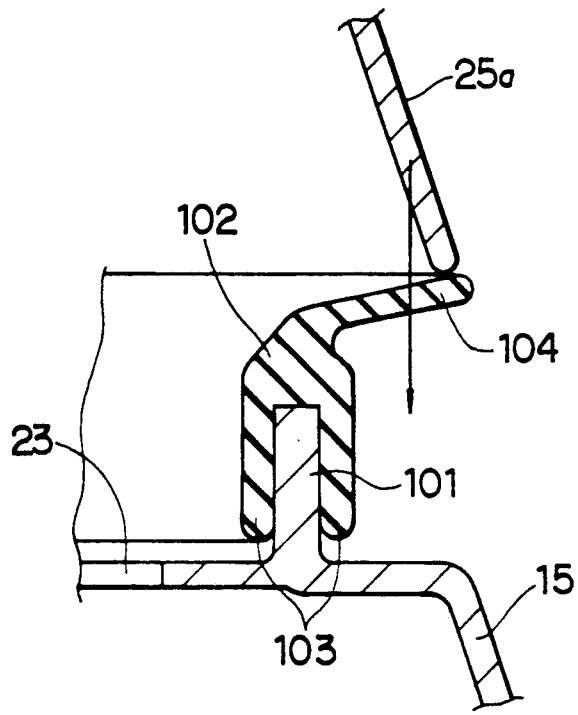
FIG. 19 is a sectional view, in an enlarged scale, of a seal member taken along the line XIX—XIX in FIG. 17.

Thus an air outlet is provided on the storage box 15. Referring to FIG. 17, a through bore 111 is provided by means of a grommet 110 at the bottom surface 21 of the storage box 15. Since the air compressed within the storage box 15 at the time of closing the lid 25 escapes to the outside from this through bore 111 so as not to increase the internal pressure of the storage box 15, the operating force is reduced.

A tubular body 112 is extended from the grommet 110 so as to project downward. This is designed to restrict the entering of rain or washing water into the storage box 15 through the bore 111. Further, the through bore 111 is used also as the leading outlet for a wiring 113 for the power circuit which supplies an exciting current to the unlocking solenoid system 77 of said lid lock mechanism 26 and/or for the power circuit of an illumination lamp (not shown) inside the storage box 15.

Figure 21:
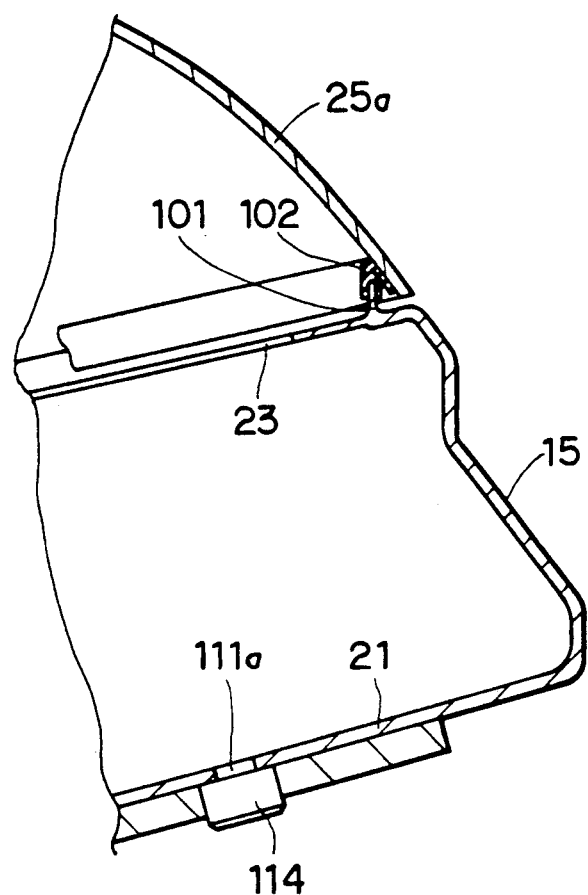
FIG. 21 is a sectional side view showing an essential portion of a further embodiment of the present invention.

FIG. 21 shows another embodiment of this invention, where a through bore 111a is provided via a reed valve system 114. The reed valve system 114 is set in a particular direction so as to allow a streaming of air only from the interior of the storage box 15 to the outside.

At the same time of making lighter the closing operation of the lid 25 in a similar manner as described above as the air is leaked from the through bore 111a, a direct entering of water may be prevented by the provision of the reed valve system 114. Also, while, if a simple air extraction hole is used, water may ultimately be accumulated such as when the system is left alone for a long period of time because moisture enters as a result of a breathing effect due to changes in the internal pressure caused by temperature, the reed valve system 114 stops the entering of moisture and effectively prevents the phenomenon as described from occurring.

In this way, with this seal system of the storage box 15, the sealing ability may be maintained with a high performance by using a bowl-like lid 25 which is broadened toward its edge, and the lid 25 may be attached by a very light force to the opening 23 of the storage box 15.

It is to be noted that the embodiment including the specific seal member can constitute alone one aspect of the present invention and, in addition, the seal member may be applied to the aforementioned embodiments with no problem.

What is claimed is:

1. A storage box of a motorcycle including an engine unit disposed at substantially a central portion of a motorcycle body and below a main tube extending rearwardly from a head pipe and including a seat detachably mounted on a seat rail extending further rearwardly from a rear end of the main tube, said storage box being disposed at substantially an upper central portion of a body frame of the motorcycle and comprising:
    a storage box body having an upper opening, a rear portion supported on said seat rail to be upwardly pivotable by a first attaching means, and a front portion detachably secured to said main tube;
    a lid member for opening and closing the opening of the storage box body and openable by a second attaching means; and
    lock means mounted on said storage box body for locking said lid member, said lock means comprising a bilateral pair of striker members disposed on an inner surface of a rear wall of said storage box body, and a bilateral pair of hook members disposed on an inner surface of a rear portion of said lid member at portions corresponding to locations of said striker members.

2. A storage box according to claim 1, wherein aid striker members are rotatably supported through a striker shaft by bearing means disposed on a base plate secured to the rear wall of said storage box, each of said striker members having a radial groove and a stepped portion, and wherein said lock means further includes a level member mounted on the striker shaft and a spring member disposed between said lever member and said base plate, said lever member being engaged with said stepped portion of said striker in a locked position thereof and said spring member being urged to always move said striker member in a lock releasing direction.

3. A storage box according to claim 2, wherein said lock means further includes solenoid means disposed on said base plate and operative when energized to release said lever member from the stepped portion against the spring force of said spring member.

4. A storage box according to claim 3, wherein said solenoid means includes a movable magnetic core connected to said lever member.

5. A storage box according to claim 3, wherein said solenoid means is operatively connected to an engine switch.

6. A storage box according to claim 1, wherein said storage box body is made of a resin material.

7. A storage box according to claim 6, wherein said storage box body is composed of two halves integrally joined together.

8. A storage box according to claim 1, wherein said first attaching means comprises a first hinge means for supporting the storage box body to be upwardly swingable, and said second attaching means comprises a second hinge means for supporting the lid member to be upwardly swingable.

9. A storage box according to claim 8, wherein said first hinge means is disposed at an outer rear end portion of said storage box body, and said second hinge means is disposed at an inner front end portion of said storage box body.

10. A storage box of a motorcycle including an engine unit disposed at substantially a central portion of a motorcycle body and below a main tube extending rearwardly from a head pipe and including a seat detachably mounted on a seat rail extending further rearwardly from a rear end of the main tube, said storage box being disposed at substantially an upper central portion of a body frame of the motorcycle and comprising:
    a storage box body having an upper opening, a rear portion supported on said seat rail to be upwardly swingable by a first hinge means, a front portion detachably secured to said main tube and a bottom plate;
    a lid member for opening and closing the opening of the storage box body and being mounted to be upwardly swingable openable by a second hinge means; and
    lock means mounted on said storage box body for locking said lid member;
    said second hinge means being secured to an inner front end portion of said bottom plate, said second hinge means comprising a base plate secured to the bottom plate, a pair of bearings disposed on said base plate in a standing manner for pivotally supporting said lid member through a support shaft of the lid member provided with an eccentric portion, a pair of swingable levers extending from said lid member and being secured to both ends of the support shaft, and a plurality of spring means each having one end secured to said eccentric portion of the support shaft and another end secured to said base plate.

11. A storage box according to claim 10, wherein said spring means comprise coil springs arranged in parallel to each other.

12. A storage box of a motorcycle including an engine unit disposed at substantially a central portion of a motorcycle body and below a main tube extending rearwardly from a head pipe and including a seat detachably mounted on a seat rail extending further rearwardly from a rear end of the main tube, said storage box being disposed at substantially an upper central portion of a body frame of the motorcycle and comprising:

- a storage box body having an upper opening, a rear portion supported to said seat rail to be upwardly swingable by a first hinge means, and a front portion detachably secured to said main tube;
- a lid member for opening and closing the opening of the storage box body and mounted to be upwardly swingable openable by a second hinge means;
- lock means mounted to said storage box body for locking said lid member; and
- a bilateral pair of reinforcing means each disposed on an inner surface of said lid member at a portion near said opening of the storage box body when the lid member is closed for preventing said lid member from being deformed when the same is pivoted to close the storage box body.

13. A storage box according to claim 12, wherein said pair of reinforcing means are disposed on an inner surface of said lid member at both longitudinal side portions thereof, each reinforcing means comprising a reinforcing tongue member extending from said lid member, a pipe member fixed to an inner peripheral surface of said lid member, and a reinforcing rib downwardly extending from the pipe member.

14. A storage box of a motorcycle including an engine unit disposed at substantially a central portion of a motorcycle body and below a main tube extending rearwardly from a head pipe and including a seat detachably mounted on a seat rail extending further rearwardly from a rear end of the main tube, said storage box being disposed at substantially an upper central portion of a body frame of the motorcycle and comprising:

- a storage box body having an upper portion defining an opening and having a rear portion supported on the body frame to be pivotable by a first attaching means,
- a lid member for opening and closing the opening of the storage box body by a second attaching means; and
- lock means mounted on said storage box body for locking said lid member;
- the rear portion of the said storage box body including a rear wall on which said lock means is secured, a through hole being formed in said rear wall at a portion behind said lock means.

15. A storage box according to claim 14, wherein said through hole is concealed by a front end of the seat when the same is mounted on the seat rail.

16. A storage box of a motorcycle being disposed at substantially an upper central portion of a body frame of the motorcycle, the storage box comprising:

- a storage box body having an upper portion defining an opening and having a rear portion supported to the body frame to be pivotable by a first attaching means;
- a lid member for opening and closing the opening of the storage box body by a second attaching means;
- lock means mounted on said storage box body for locking said lid member; and
- sealing means for maintaining a locked condition between said lid member and said storage box body in a sealed manner, said sealing means comprising an elastic seal member including a body portion mounted to a rib member disposed in a standing manner on substantially an entire edge portion of the upper portion of said storage box body defining the opening thereof, said elastic seal member being provided with a flanged portion extending outward from a free end of the body portion thereof, said flanged portion being deformed downwardly by a lower edge of said lid member in a manner tightly contacting to an inner surface of said lid member when said lid member is closed from an upper opened position.

17. A storage box according to claim 16, wherein said body portion of the elastic seal member overlies opposite sides of said rib member.

18. A storage box according to claim 16, including air outlet means at a bottom portion of said storage box body.

19. A storage box according to claim 18, wherein said air outlet means comprises a through hole in which is disposed a grommet having a tubular portion extending downward.

20. A storage box according to claim 19, wherein said lock means includes solenoid means including a wiring through which an electric power is applied to the solenoid means, said wiring extending outward through said through hole.

21. A storage box according to claim 18, wherein said air outlet means comprises a through hole penetrating the bottom wall of said storage box body, and a reed valve fitted into the through hole for allowing air in the storage box body to be unidirectionally discharged.

22. A storage box according to claim 16, wherein said storage box body is made of a resin material.

23. A storage box according to claim 22, wherein said storage box body is composed of two halves integrally joined together.

24. A storage box according to claim 16, wherein said first attaching means comprises a first hinge means for supporting the storage box body to be upwardly swingable, and said second attaching means comprises a second hinge means for supporting the lid member to be upwardly swingable.

25. A storage box according to claim 24, wherein said first hinge means is disposed at an outer rear portion of said storage box body, and said second hinge means is disposed at an inner front end portion of said storage box body.

* * * * *